(12) United States Patent
Watson et al.

(10) Patent No.: US 8,316,361 B2
(45) Date of Patent: Nov. 20, 2012

(54) METHOD OF ENABLING A USER TO UPDATE ONE OR MORE LOW-LEVEL RESOURCES OF A COMPUTER SYSTEM IN A USER-FRIENDLY MANNER

(75) Inventors: Eric Christopher Watson, Sacramento, CA (US); Michael Joseph McGrath, Citrus Heights, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 2458 days.

(21) Appl. No.: 10/340,236

(22) Filed: Jan. 9, 2003

(65) Prior Publication Data

US 2004/0148596 A1  Jul. 29, 2004

(51) Int. Cl.
*G06F 9/44* (2006.01)
*G06F 9/445* (2006.01)

(52) U.S. Cl. ......... 717/168; 717/104; 717/170; 717/178

(58) Field of Classification Search ................. 717/169, 717/168
See application file for complete search history.

(56) References Cited

U.S. PATENT DOCUMENTS

| | | | | |
|---|---|---|---|---|
| 5,444,850 A * | 8/1995 | Chang | ........................... | 709/222 |
| 5,577,244 A * | 11/1996 | Killebrew et al. | ............ | 717/169 |
| 6,405,309 B1 * | 6/2002 | Cheng et al. | ....................... | 713/1 |
| 7,099,967 B2 * | 8/2006 | Farkas et al. | .................. | 710/104 |
| 7,103,687 B2 * | 9/2006 | Farkas et al. | .................. | 710/104 |
| 7,207,039 B2 * | 4/2007 | Komarla et al. | .............. | 717/178 |
| 7,222,339 B2 * | 5/2007 | Rothman et al. | .............. | 717/168 |
| 2002/0194313 A1 * | 12/2002 | Brannock | ...................... | 709/220 |
| 2003/0066062 A1 * | 4/2003 | Brannock et al. | ............. | 717/169 |
| 2003/0110369 A1 * | 6/2003 | Fish et al. | .......................... | 713/1 |
| 2004/0025002 A1 * | 2/2004 | Cepulis et al. | .................... | 713/2 |
| 2004/0027375 A1 * | 2/2004 | Ellis et al. | ...................... | 345/753 |
| 2004/0059900 A1 * | 3/2004 | Backman et al. | ................. | 713/1 |
| 2004/0128493 A1 * | 7/2004 | Zimmer et al. | ................... | 713/1 |
| 2004/0158828 A1 * | 8/2004 | Zimmer et al. | .................. | 717/168 |
| 2004/0230963 A1 * | 11/2004 | Rothman et al. | .............. | 717/168 |
| 2006/0174240 A1 * | 8/2006 | Flynn | ............................ | 717/170 |
| 2007/0094655 A1 * | 4/2007 | Rostampour | ................. | 717/168 |

OTHER PUBLICATIONS

"Dell Precision.TM. WorkStation 730 User's Guide", Aug. 2001, BIOS Overview (33 pages). Online retrieved at <http://support.dell.com/support/edocs/systems/ws730/ug/bios.htm>.*

* cited by examiner

*Primary Examiner* — Thuy Dao

(57) ABSTRACT

A method of enabling a user to update one or more low-level resources of a computer system in a user-friendly manner is described. In particular, multiple computer files are grouped. These computer files are utilized in a pre-boot environment to provide a menu-driven update guide that requests one or more responses from the user. Moreover, the computer files are utilized to initiate updating of the low-level resources based on the responses. Furthermore, a bootable image file of the computer files is generated. The user is provided access to the bootable image file.

25 Claims, 17 Drawing Sheets

\EFI\HP\DIAG\DOCUMENTATION Directory

METHOD OF ENABLING A USER TO UPDATE ONE OR MORE LOW-LEVEL RESOURCES OF A COMPUTER SYSTEM IN A USER-FRIENDLY MANNER

BACKGROUND OF THE INVENTION

1. Field of the Invention

The present invention generally relates to updating low-level resources of a computer system. More particularly, the present invention relates to providing a user-friendly technique for enabling a user to update low-level resources of the computer system.

2. Related Art

A firmware image, which is a low-level resource of a computer system, is stored in several ROM (Read-Only Memory) devices within the computer system. There are several types of firmware images, such as server firmware, workstation firmware, PCI (Peripheral Component Interconnect) I/O card firmware, disk drive (or mass storage) firmware, etc.

Rather than using nonprogrammable (or single write) ROM devices to store firmware images, the computer industry is migrating towards the use of programmable (or multiple write) ROM devices to store firmware images. There are several types of programmable ROM devices, including EPROM, EEPROM, and flash-ROM. These programmable ROM devices allow old firmware images to be updated with new firmware images. This firmware update is performed due to any of several reasons. Improving performance, patching a security defect, repairing a defect, and expanding functionality are some examples of reasons for performing a firmware update.

Typically, a firmware revision file is made available to users (e.g., customers) of the computer system to update a firmware image. The user performs a firmware update procedure that usually involves a sequence of complicated steps requiring strong technical knowledge of the computer system, especially of low-level commands. If the user lacks the technical knowledge, assistance is required from specialized technical personnel. Moreover, the firmware update procedure is cumbersome and is not user-friendly. An incorrectly performed firmware update can damage the computer system or can render the computer system inoperable.

Moreover, a separate and distinct firmware update procedure has to be performed for each firmware image that will be updated. This increases the possibility of an error that could disable the computer system. Additionally, the performance of multiple firmware update procedures can be tedious and time consuming.

SUMMARY OF THE INVENTION

A method of enabling a user to update one or more low-level resources of a computer system in a user-friendly manner is disclosed. In particular, multiple computer files are grouped. These computer files are utilized in a pre-boot environment to provide a menu-driven update guide that requests one or more responses from the user. Moreover, the computer files are utilized to initiate updating of the low-level resources based on the responses. Furthermore, a bootable image file of the computer files is generated. The user is provided access to the bootable image file.

BRIEF DESCRIPTION OF THE DRAWINGS

The accompanying drawings, which are incorporated in and form a part of this specification, illustrate embodiments of the invention and, together with the description, serve to explain the principles of the present invention.

DETAILED DESCRIPTION OF THE INVENTION

Reference will now be made in detail to embodiments of the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention.

Figure 1:
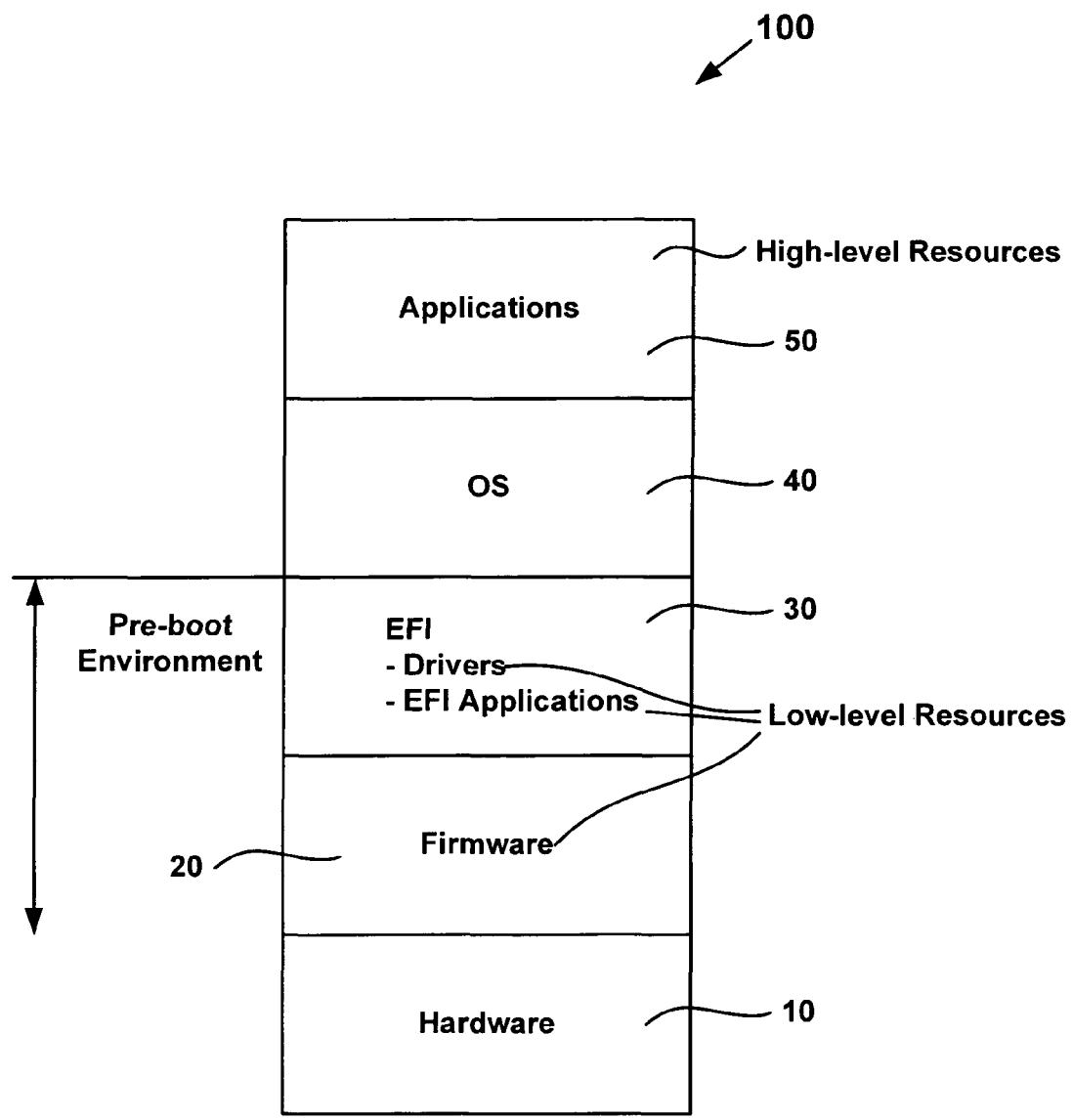
FIG. 1 illustrates a computer system architecture in accordance with an embodiment of the present invention.

FIG. 1 illustrates a computer system architecture 100 in accordance with an embodiment of the present invention. As shown in FIG. 1, the computer system architecture 100 includes a hardware layer 10, a firmware layer 20, an EFI (Extensible Firmware Interface) layer 30, an OS (operating system) layer 40, and an application layer 50.

Low-level resources, such as firmware images, drivers, and EFI applications, can be updated using the method of the present invention. High-level resources are typically applications in the application layer 50. The EFI layer 30 provides an interface for the hardware layer 10, the firmware layer 20, and the OS layer 40. In particular, the EFI layer 30 is an example of a pre-boot environment. Typically, when a computer system is booted, a power-on self-test (POST) is performed. The POST comprises a series of diagnostic tests that run automatically when the computer system is turned on. The pre-boot environment refers to the environment between POST and loading of the operating system 40. In the pre-boot environment, the EFI environment 30 is loaded, providing functionality before the operating system 40 is loaded.

In an embodiment of the present invention, a method is provided to enable a user to update the low-level resources (e.g., firmware images, drivers, and EFI applications) of a computer system in a user-friendly manner. In particular, the user updates the low-level resources by utilizing computer files in the pre-boot environment (e.g., EFI environment 30).

Figure 2:
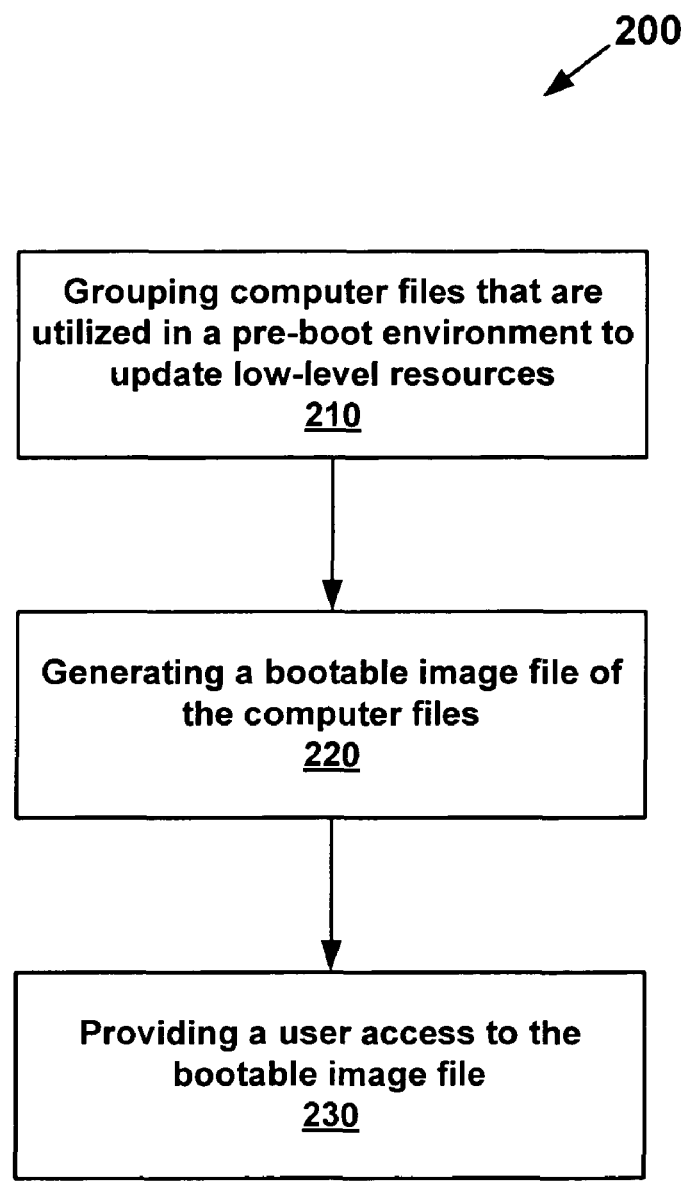
FIG. 2 illustrates a flow chart showing a method of enabling a user to update low-level resources of a computer system in a user-friendly manner in accordance with an embodiment of the present invention.

FIG. 2 illustrates a flow chart showing a method 200 of enabling a user to update low-level resources of a computer system in a user-friendly manner in accordance with an embodiment of the present invention.

At step 210, multiple computer files are grouped into a file structure. The computer files are utilized in a pre-boot environment (e.g., EFI environment 30) to provide a menu-driven update guide that requests one or more responses from the user. Moreover, the computer files are utilized in a pre-boot environment (e.g., EFI environment 30) to initiate updating of the low-level resources (e.g., firmware images, drivers, and EFI applications) of the computer system based on the responses from the user.

The computer files includes one or more software tools and one or more updated versions of the low-level resources (e.g., firmware images, drivers, and EFI applications) such that in a single procedure the user can perform a system-wide update of the low-level resources (e.g., firmware images, drivers, and EFI applications) of the computer system unlike the prior art technique where the user needed to perform a separate and distinct firmware update procedure for each firmware image that would be updated. Moreover, since the user is guided through the update process with a menu-driven update guide, the user can perform the update process irrespective of the user's technical knowledge of the computer system unlike the prior art technique where the user needed strong technical knowledge of the computer system. In sum, the method 200 simplifies the process for updating low-level resources (e.g., firmware images, drivers, and EFI applications) of the computer system.

Continuing at step 220, a bootable image file of the computer files is generated. In an embodiment, the bootable image file is formatted according to an ISO 9660 image file format. The bootable image file can be stored in a hard drive.

At step 230, the user is provided access to the bootable image file so that the user can utilize the bootable image file to update the low-level resources (e.g., firmware images, drivers, and EFI applications) of the computer system. The user can be provided access to the bootable image file in any manner (e.g., via a computer-readable medium, via a Web site, etc.)

FIGS. 3A-3F illustrate a file structure of the computer files that are utilized in a pre-boot environment to update low-level resources of a computer system in accordance with an embodiment of the present invention. Although the discussion below will focus on updating firmware images, the discussion is equally applicable to updating drivers and EFI applications.

Figure 3A:
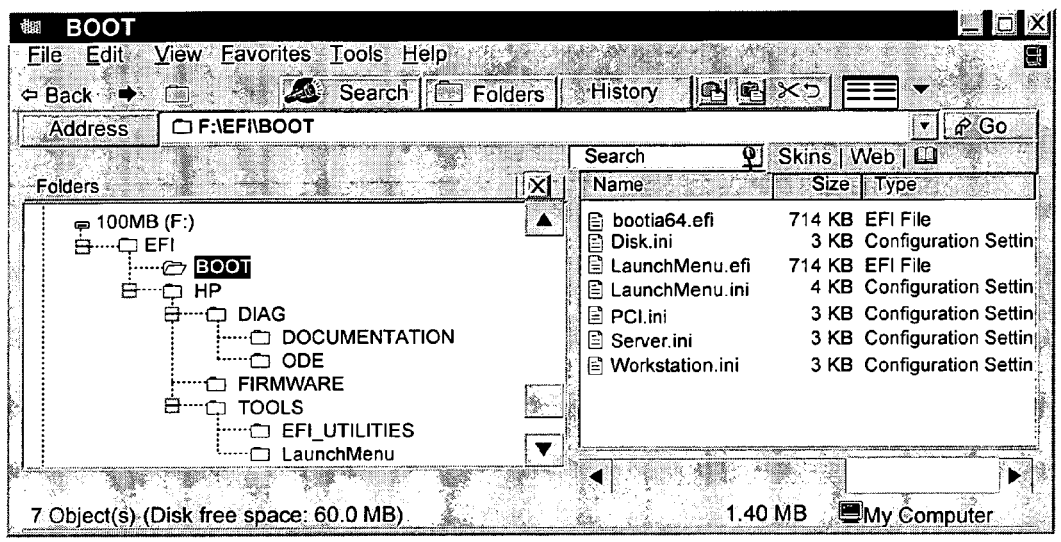
FIGS. 3A-3F illustrate a file structure of computer files that are utilized in a pre-boot environment to update low-level resources of a computer system in accordance with an embodiment of the present invention.

As shown in FIG. 3A, the \EFI\BOOT directory includes the computer files bootia64.efi, LaunchMenu.efi, and LaunchMenu.ini for creating the menu-driven update guide in the EFI environment to guide the user through the update process. Furthermore, the \EFI\BOOT directory can include an INI computer file for each type of low-level resource that will be updated to provide configuration information. For example, the Server.ini file corresponds to server firmware. The Workstation.ini file corresponds to workstation firmware. The PCI.ini file corresponds to PCI (Peripheral Component Interconnect) I/O card firmware. Finally, the Disk.ini file corresponds to disk drive (or mass storage) firmware. Each INI file includes information that describes the computer systems that can be updated with the firmware corresponding to the INI file.

Figure 3B:
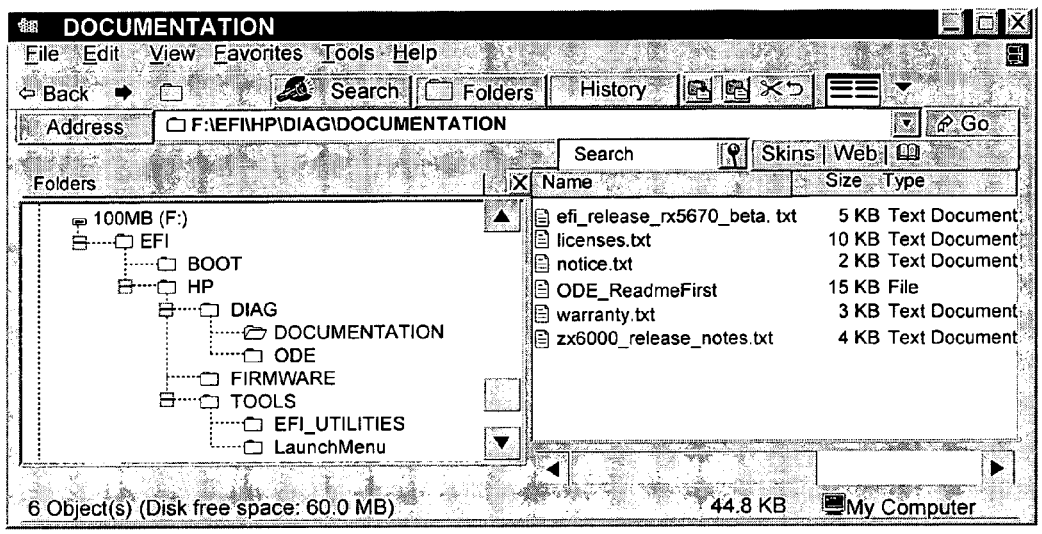

The \EFI\HP\DIAG\DOCUMENTATION directory stores computer files associated with documentation, such as licensing, release notes, and other types of documentation, as depicted in FIG. 3B

Figure 3C:
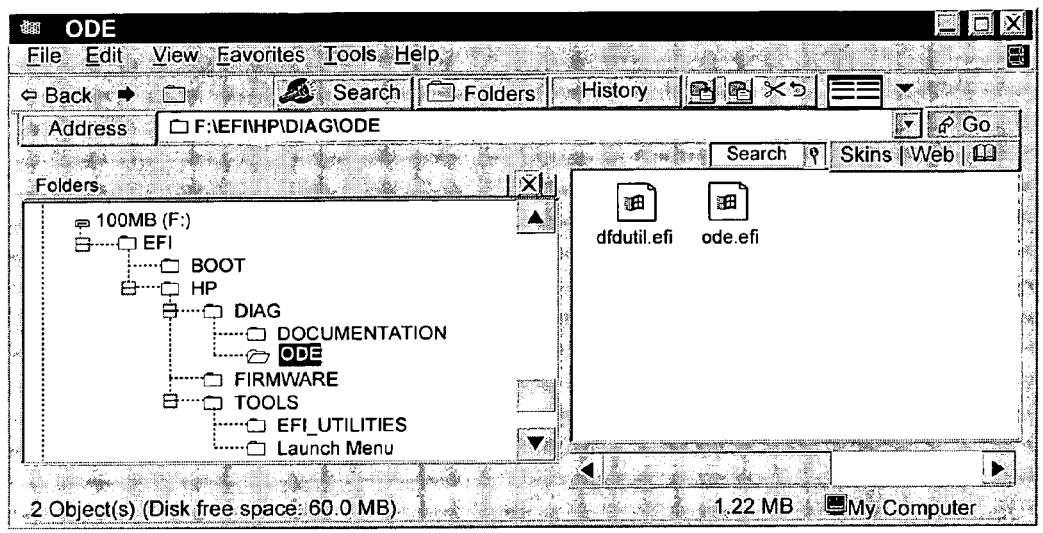

As shown in FIG. 3C, the \EFI\HP\DIAG\ODE directory stores the computer files dfdutil.efi and ode.efi which are needed by legacy computer systems in order to perform certain firmware updates. The ode.efi file provides the Offline Diagnostic Environment (ODE) while the dfdutil.efi runs in the ODE and is used in updating disk drive firmware.

Figure 3D:
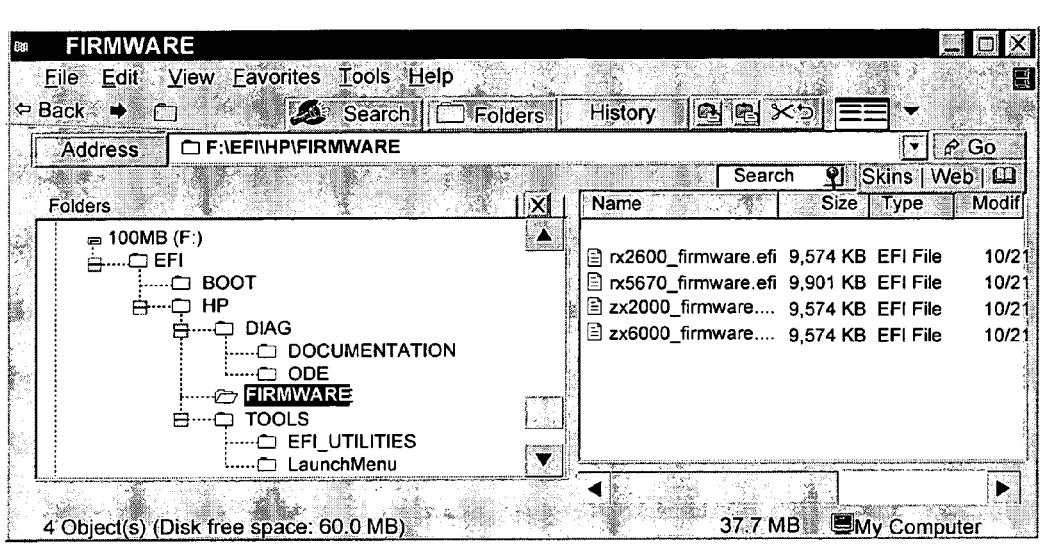

Moreover, the \EFI\HP\FIRMWARE directory stores computer files which have the updated firmware which will replace particular firmware images of the computer system, as depicted in FIG. 3D. It should be understood that a DRIVER directory would store computer files that have updated drivers while an EFIapplication directory would store computer files that have updated EFI applications.

Figure 3E:
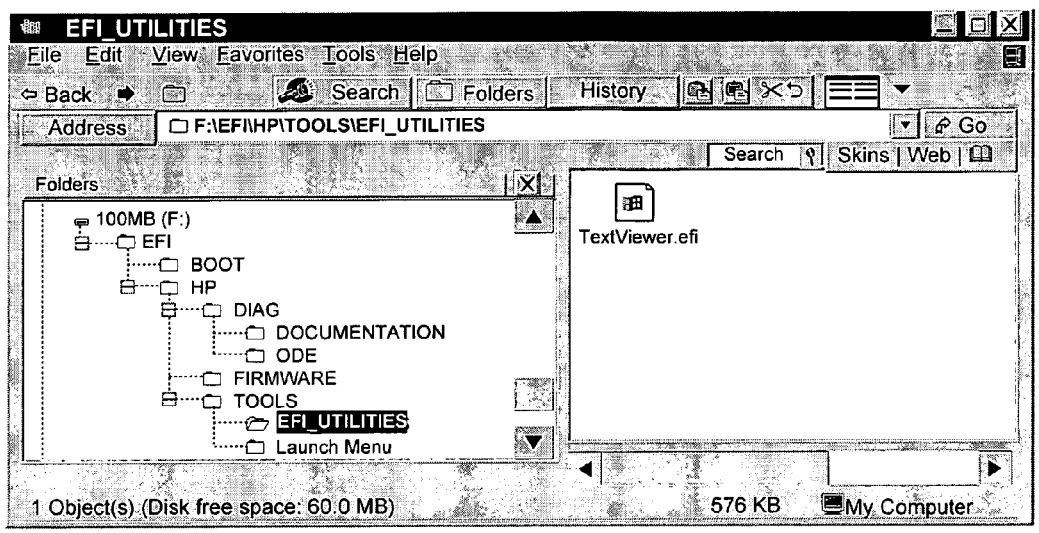

Furthermore, as depicted in FIG. 3E, the \EFI\HP\TOOLS\EFI_UTILITIES directory stores the computer file TextViewer.efi which is an EFI level utility used for the update process of the present invention. In particular, the TextViewer.efi file is able to read the computer files of the \EFI\HP\DIAG\DOCUMENTATION directory.

Figure 3F:
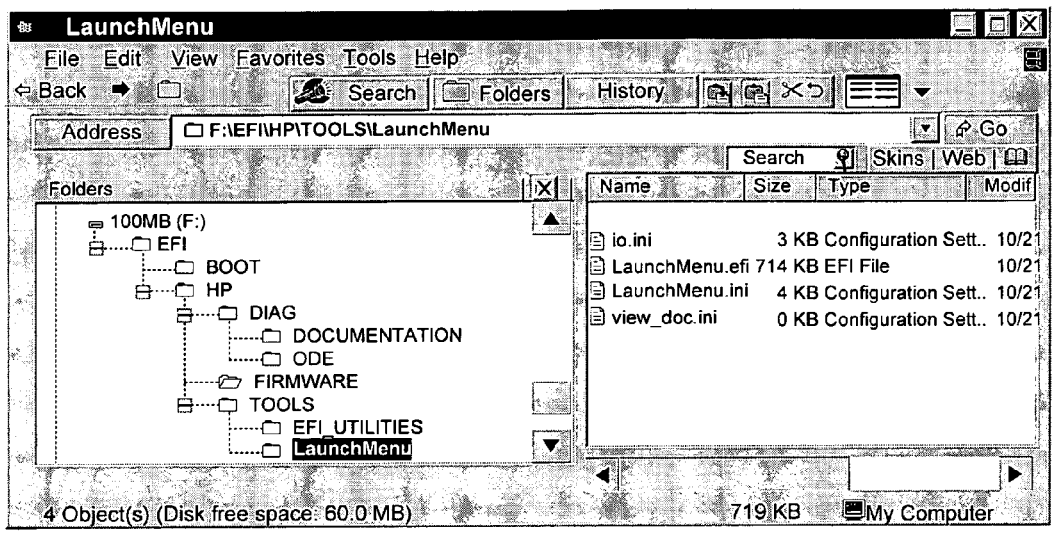

Lastly, the \EFI\HP\TOOLS\LaunchMenu directory is optionally used to store backup copies of particular computer files, as shown in FIG. 3F.

Figure 4:
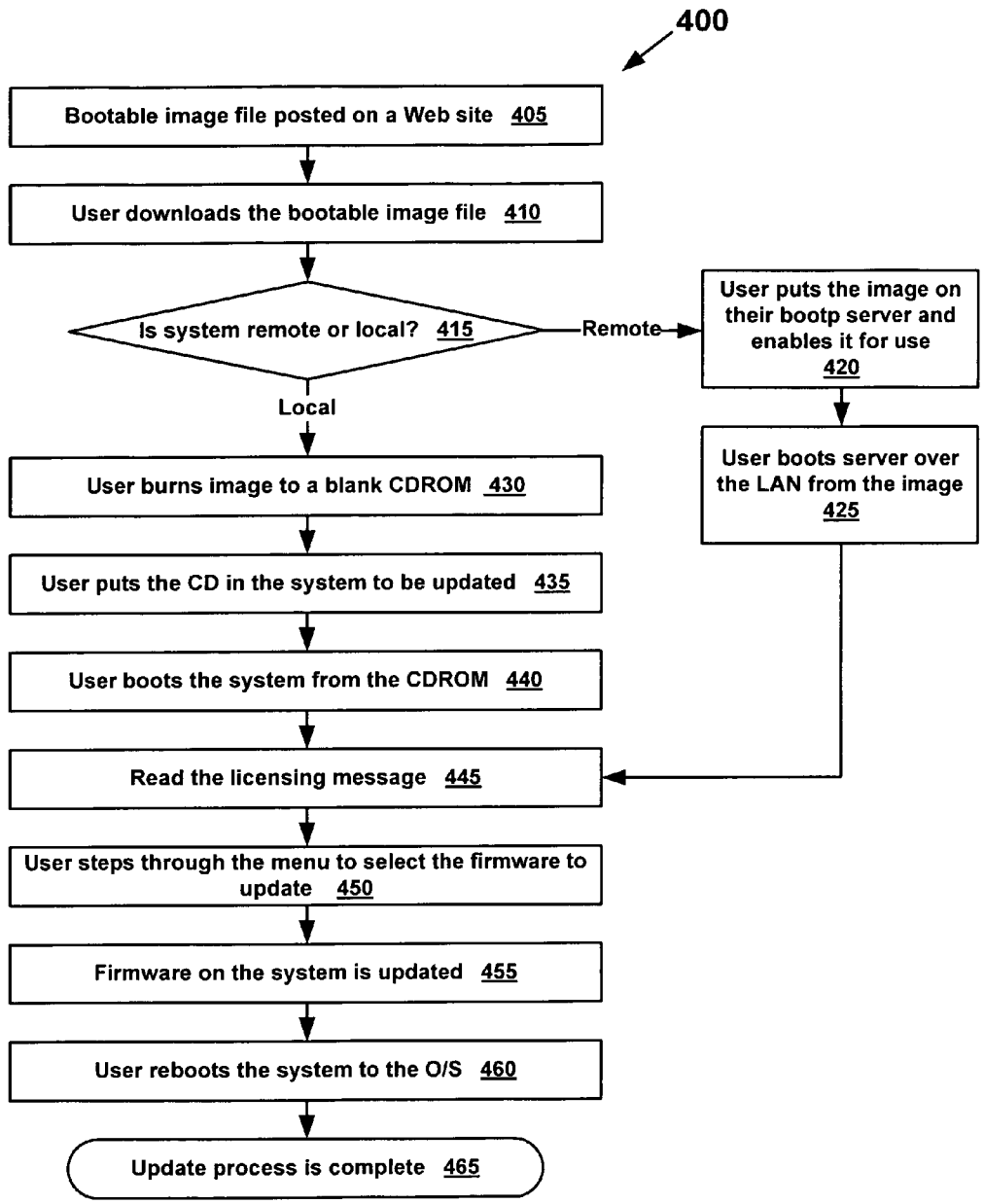
FIG. 4 illustrates a flow chart showing a method of updating firmware in accordance with an embodiment of the present invention.

FIG. 4 illustrates a flow chart showing a method 400 of updating firmware in accordance with an embodiment of the present invention. Although the discussion below will focus on updating firmware images, the discussion is equally applicable to updating drivers and EFI applications.

At step 405, the bootable image file is posted on a Web site, whereas the bootable image file has the computer files described above. Periodically, a new bootable image file can be posted, providing the user a single source for updating the low-level resources of the computer system. In an embodiment, the bootable image file is formatted according to an ISO 9660 image file format. At step 410, the user downloads the bootable image file to update the low-level resources (e.g., firmware images, drivers, and EFI applications) of the computer system.

If the computer system is local (or locally boots), the method proceeds to step 430. If the computer system is remote (or remotely boots), the method proceeds to step 420. At step 420, the user stores the bootable image file on the BOOTP server and enables it for use. At step 425, the user boots the BOOTP server over a LAN from the bootable image file. Other remote-boot processes can be used. The method then proceeds to step 445.

Figure 7A:
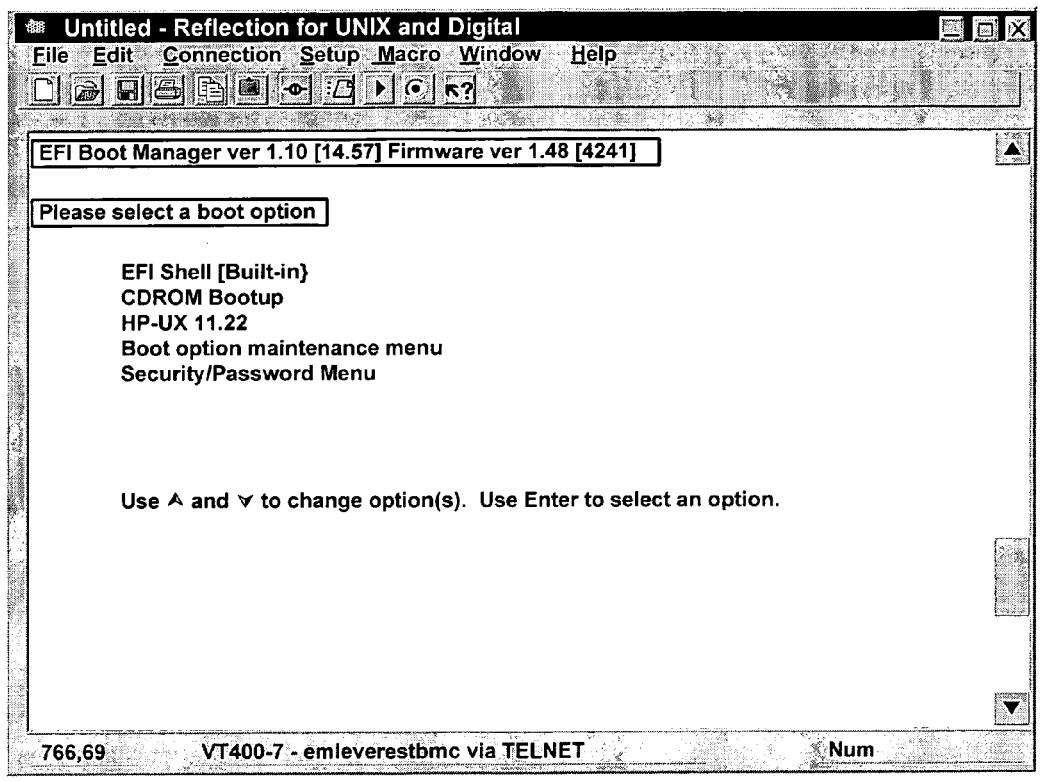
FIGS. 7A-7F illustrate screen captures of the operation of the method of FIG. 4 in accordance with an embodiment of the present invention.

Continuing, at step 430, the user burns the bootable image file to an unused computer-readable medium. In an embodiment, the computer-readable medium is a CD-ROM. At step 435, the user puts the CD-ROM in the computer system whose low-level resources are to be updated. At step 440, the user boots the computer system from the CD-ROM. FIG. 7A illustrates a screen capture of the execution of step 440 in the EFI environment. Here, the CD-ROM Bootup menu item is selected by the user.

Figure 7B:
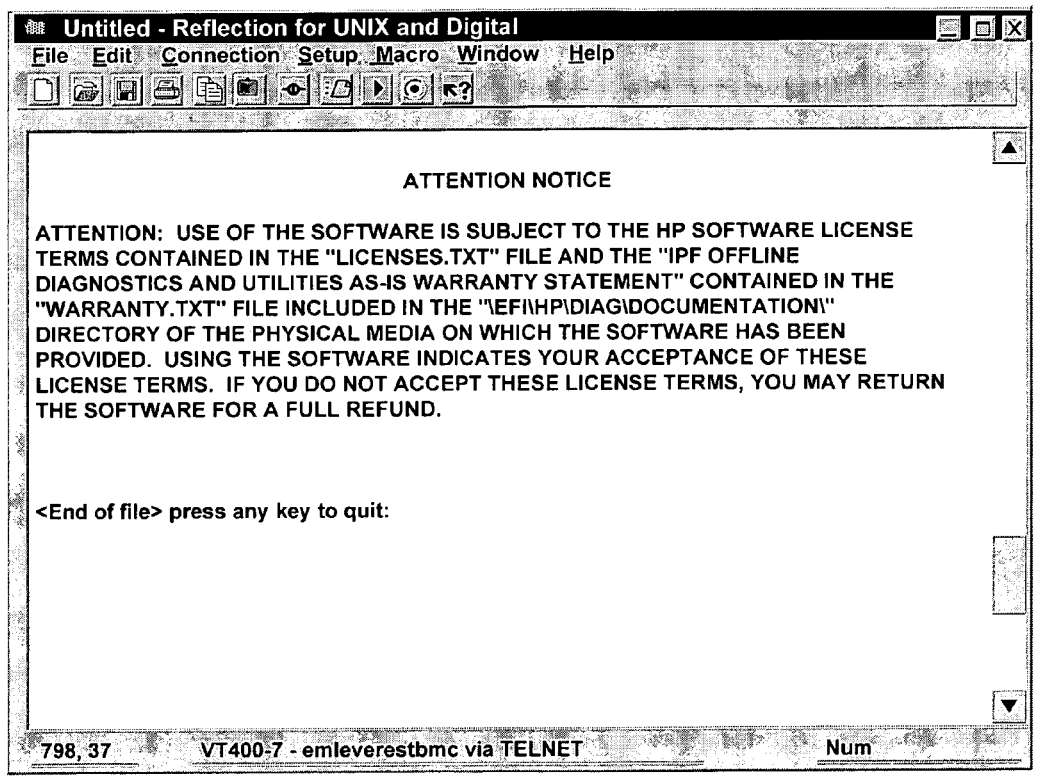

Furthermore, at step 445, a licensing message is presented to the user to read. FIG. 7B illustrates a screen capture of the execution of step 445 in the EFI environment. Here, the user can continue by pressing any key.

Figure 7C:
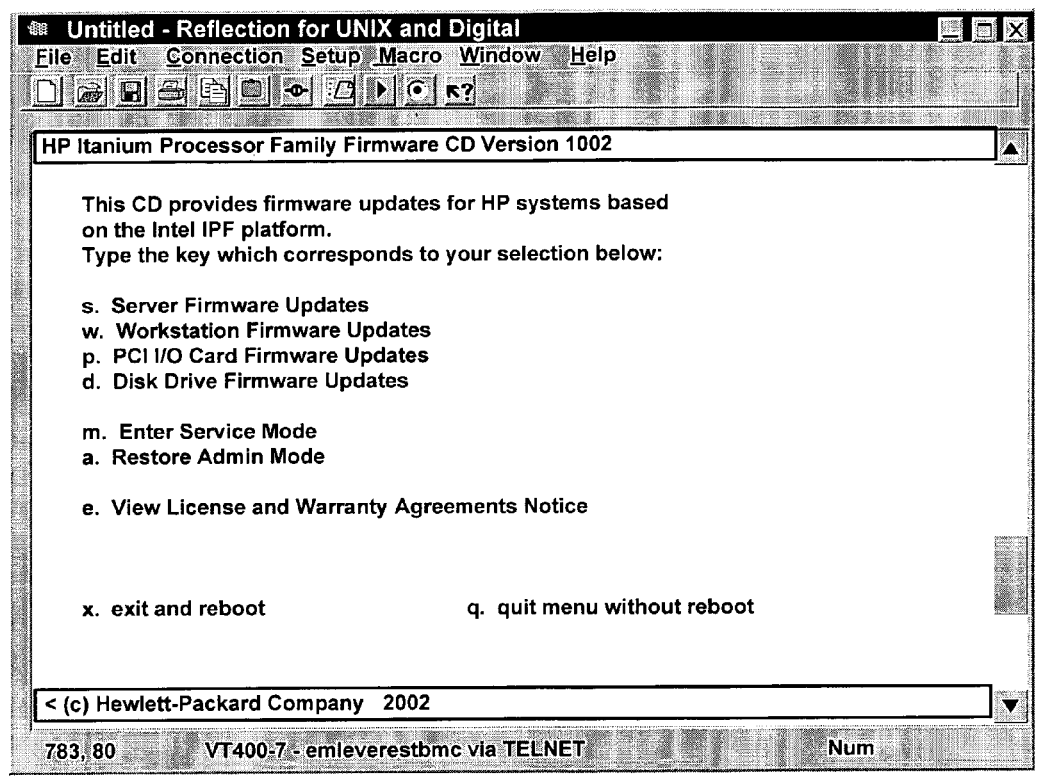
Figure 7D:
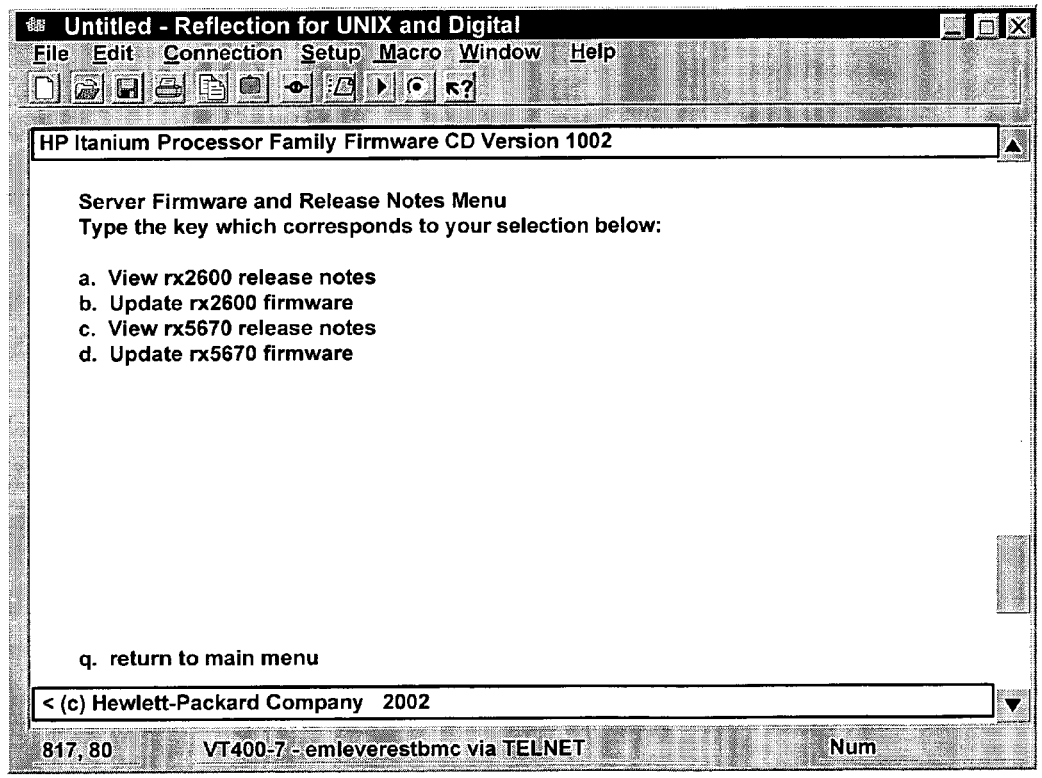

At step 450, the user steps through the menus of the menu-driven update guide in the EFI environment to select the firmware to update. FIGS. 7C and 7D illustrate screen captures of the execution of step 450 in the EFI environment.

Figure 7E:
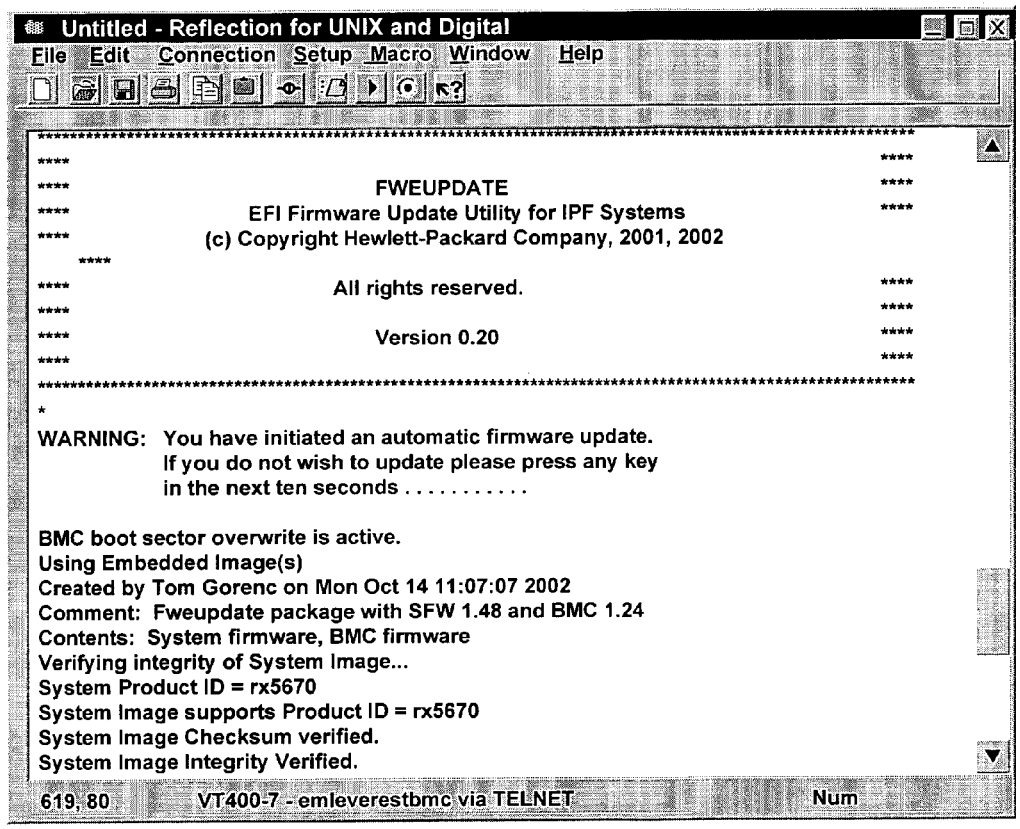
Figure 7F:
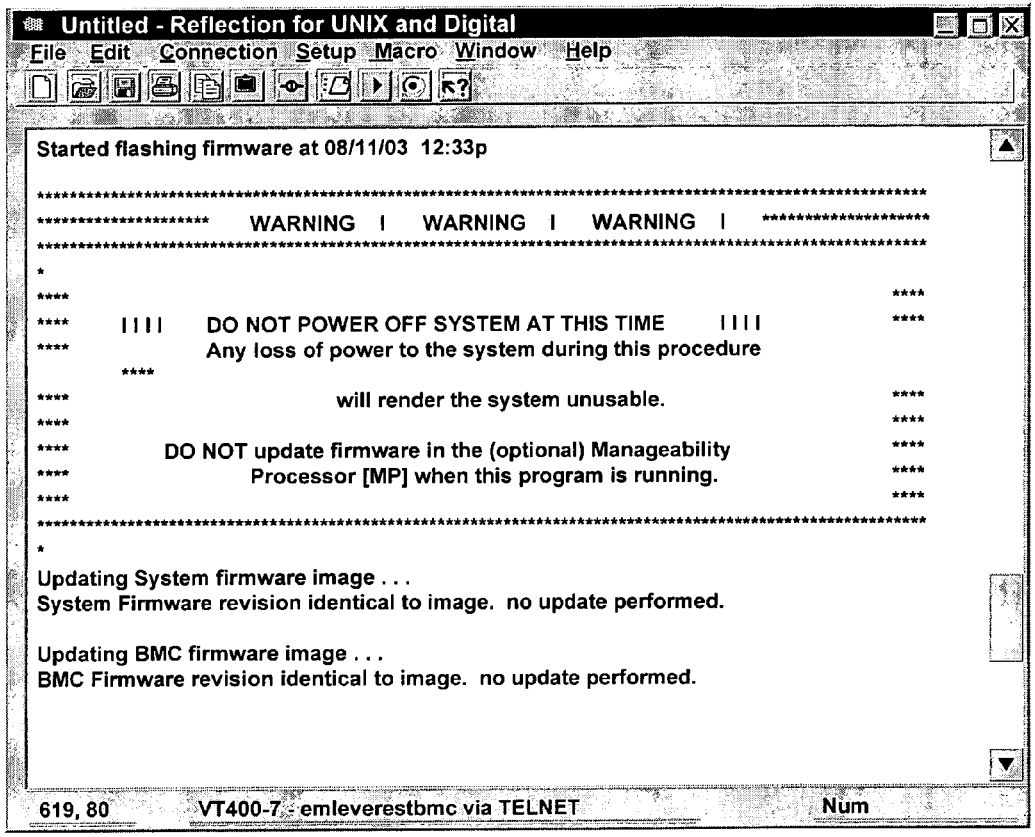

Moreover, at step 455, the firmware on the computer system is updated based on the user's responses to the menus of the menu-driven update guide in the EFI environment. If a firmware image of the computer system is current, no update is performed. FIGS. 7E and 7F illustrate screen captures of the execution of step 455 in the EFI environment.

At step 460, the user reboots the computer system to the operating system. Lastly, at step 465, the update process is complete. As described above, the computer files in the bootable image file includes one or more software tools and one or more updated versions of the low-level resources (e.g., firmware images, drivers, and EFI applications) such that in a single procedure the user can perform a system-wide update of the low-level resources (e.g., firmware images, drivers, and EFI applications) of the computer system unlike the prior art technique where the user needed to perform a separate and distinct firmware update procedure for each firmware image that would be updated. Moreover, since the user is guided through the update process with a menu-driven update guide, the user can perform the update process irrespective of the user's technical knowledge of the computer system unlike the prior art technique where the user needed strong technical knowledge of the computer system. In sum, the method 400 simplifies the process for updating low-level resources (e.g., firmware images, drivers, and EFI applications) of the computer system.

Figure 5:
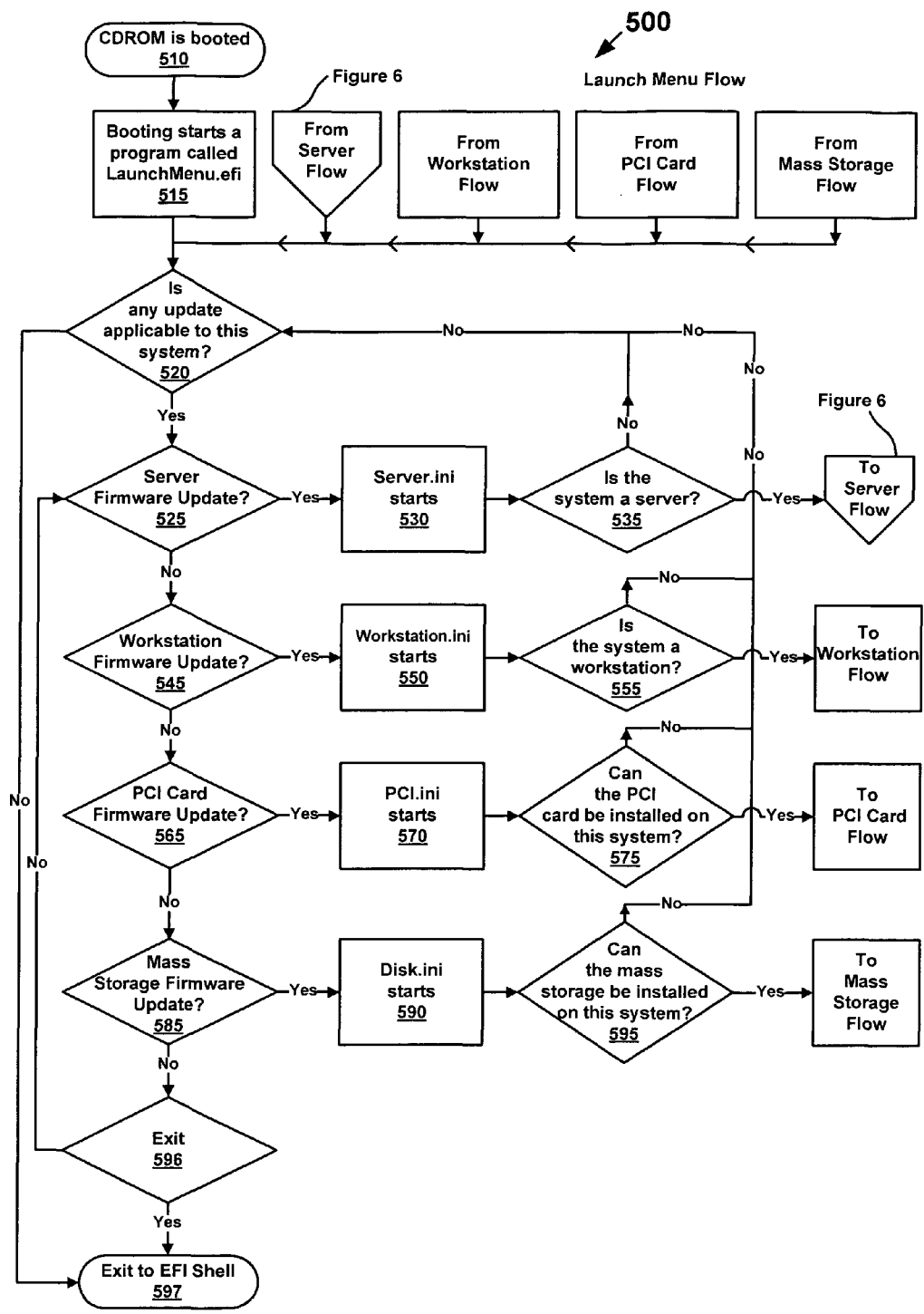
FIG. 5 illustrates a flow chart showing a launch menu flow within the method of FIG. 4 in accordance with an embodiment of the present invention.

FIG. 5 illustrates a flow chart showing a launch menu flow 500 within the method 400 of FIG. 4 in accordance with an embodiment of the present invention.

At step 510, the user boots from the CD-ROM having the bootable image file. At step 515, the booting process starts the program called LaunchMenu.efi (which was described above).

Moreover, at step 520, it is determined whether any update file stored in the CD-ROM is applicable to the low-level resources of the computer system of the user. If none of the update files is applicable to the computer system, the launch menu flow 500 proceeds to step 597. Otherwise the launch menu flow 500 displays a menu (e.g., screen capture of FIG. 7C) and proceeds to step 525 upon receiving the selection from the user.

Continuing at step 525, it is determined whether the user desires to update server firmware. If the user does not desire to update server firmware, the launch menu flow 500 proceeds to step 545. Otherwise, the launch menu flow 500 proceeds to step 530. At step 530, the Server.ini file is started. Moreover, at step 535, it is determined whether the computer system is a server based on information from the Server.ini file. If the computer system is not a server, the launch menu flow 500 proceeds to step 520. Otherwise, the launch menu flow 500 proceeds to the server flow of FIG. 6.

At step 545, it is determined whether the user desires to update workstation firmware. If the user does not desire to update workstation firmware, the launch menu flow 500 proceeds to step 565. Otherwise, the launch menu flow 500 proceeds to step 550. At step 550, the Workstation.ini file is started. Moreover, at step 555, it is determined whether the computer system is a workstation based on information from the Workstation.ini file. If the computer system is not a workstation, the launch menu flow 500 proceeds to step 520. Otherwise, the launch menu flow 500 proceeds to the workstation flow, which is similar to the server flow of FIG. 6.

Moreover, at step 565, it is determined whether the user desires to update PCI card firmware. If the user does not desire to update PCI card firmware, the launch menu flow 500 proceeds to step 585. Otherwise, the launch menu flow 500 proceeds to step 570. At step 570, the PCI.ini file is started. Moreover, at step 575, it is determined whether the PCI card can be installed in the computer system based on information from the PCI.ini file. If the PCI card cannot be installed in the computer system, the launch menu flow 500 proceeds to step 520. Otherwise, the launch menu flow 500 proceeds to the PCI Card flow, which is similar to the server flow of FIG. 6.

Furthermore, at step 585, it is determined whether the user desires to update mass storage firmware. If the user does not desire to update mass storage firmware, the launch menu flow 500 proceeds to step 596 where it determined whether to proceed to step 525 or to step 597 to exit to the EFI shell. Otherwise, the launch menu flow 500 proceeds to step 590. At step 590, the Disk.ini file is started. Moreover, at step 595, it is determined whether the mass storage can be installed in the computer system based on information from the Disk.ini file. If the mass storage cannot be installed in the computer system, the launch menu flow 500 proceeds to step 520. Otherwise, the launch menu flow 500 proceeds to the Mass storage flow, which is similar to the server flow of FIG. 6.

Figure 6:
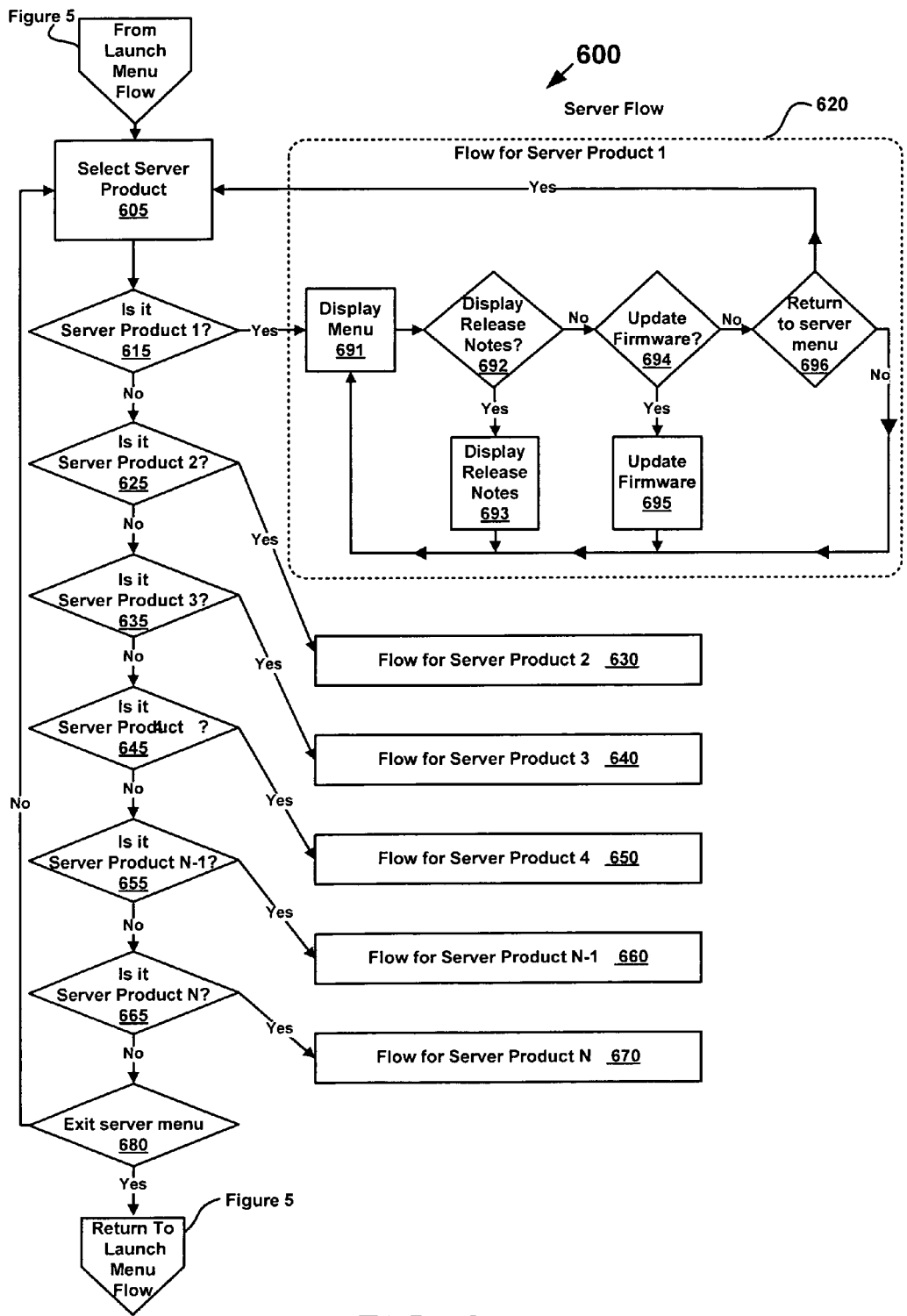
FIG. 6 illustrates a flow chart showing a server flow within the method of FIG. 4 in accordance with an embodiment of the present invention.

FIG. 6 illustrates a flow chart showing a server flow 600 within the method of FIG. 4 in accordance with an embodiment of the present invention.

At step 605, the server flow 600 displays a server product menu and proceeds to step 615 upon receiving the selection from the user. At step 615, it is determined whether the user desires to update server firmware for server product 1. If the user does not desire to update server firmware for server product 1, the server flow 600 proceeds to step 625. Otherwise, the server flow 600 proceeds to the flow 620 for server product 1. At step 691, a menu is displayed (e.g., screen capture of FIG. 7D). The flow 620 for server product 1 proceeds to step 692 upon receiving the selection from the user.

At step 692, it is determined whether the user desires to view the release notes. If the user does not desire to view the release notes, the flow 620 for server product 1 proceeds to step 694. Otherwise the flow 620 for server product 1 proceeds to step 693 where the release notes are displayed. At step 694, it is determined whether the user desires to update the server firmware. If the user does not desire to update the server firmware, the flow 620 for server product 1 proceeds to step 696. Otherwise the flow 620 for server product 1 proceeds to step 695 where the server firmware is updated. At step 696, it is determined whether the user desires to return to the server product menu. If the user does not desire to return to the server product menu, the flow 620 for server product 1 proceeds to step 691. Otherwise the flow 620 for server product 1 proceeds to step 605 where the server product menu is displayed.

It should be understood that steps 625, 635, 645, 655, and 665 are similar to step 615. Moreover, flows 630, 640, 650, 660, and 670 for server products 2-N are similar to flow 620 for server product 1.

Lastly, at step 680, it is determined whether the user desires to exit the server product menu. If the user desires to exit the server product menu, the server flow 600 proceeds to the launch menu flow 500 of FIG. 5.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method of enabling a user to update one or more low-level resources of a computer system in a user-friendly manner, said method comprising:

grouping a plurality of computer files that are utilized in a pre-boot environment;

creating a menu-driven update guide by using at least one extensible firmware interface (EFI) file and at least one initialization (INI) file, wherein said menu driven update guide requests one or more responses from said user and to initiate updating of said one or more low-level resources based on said one or more responses;

generating a bootable image file of said plurality of computer files;

downloading said bootable image file from a web site where new bootable image files are periodically posted; and providing said user access to said bootable image file.

2. The method as recited in claim 1 wherein said one or more low-level resources comprise a firmware image.

3. The method as recited in claim 1 wherein said one or more low-level resources comprise a driver.

4. The method as recited in claim 1 wherein said one or more low-level resources comprise an EFI (Extensible Firmware Interface) application.

5. The method as recited in claim 1 wherein said pre-boot environment is an EFI (Extensible Firmware Interface) environment.

6. The method as recited in claim 1 wherein said bootable image file is formatted according to an ISO 9660 image file format.

7. The method as recited in claim 1 wherein said plurality of computer files includes one or more software tools and one or more updated versions of said one or more low-level resources such that in a single procedure said user can perform a system-wide update of said one or more low-level resources of said computer system.

8. A non-transitory computer-readable medium comprising a bootable image file of a plurality of computer files that are utilized in a pre-boot environment to provide a menu-driven update guide that requests response from a user and to initiate updating of at least one low-level resource of a computer system based on said response, wherein at least one extensible firmware interface (EFI) file and at least one initialization (INI) file are used to create said menu-driven update guide, and wherein said bootable image file is downloaded from a web site where new bootable image files are periodically posted.

9. The non-transitory computer-readable medium as recited in claim 8 wherein said one or more low-level resources comprise a firmware image.

10. The non-transitory computer-readable medium as recited in claim 8 wherein said one or more low-level resources comprise a driver.

11. The non-transitory computer-readable medium as recited in claim 8 wherein said one or more low-level resources comprise an EFI (Extensible Firmware Interface) application.

12. The non-transitory computer-readable medium as recited in claim 8 wherein said pre-boot environment is an EFI (Extensible Firmware Interface) environment.

13. The non-transitory computer-readable medium as recited in claim 8 wherein said bootable image file is formatted according to an ISO 9660 image file format.

14. The non-transitory computer-readable medium as recited in claim 8 wherein said plurality of computer files includes one or more software tools and one or more updated versions of said one or more low-level resources such that in a single procedure said user can perform a system-wide update of said one or more low-level resources of said computer system.

15. The non-transitory computer-readable medium as recited in claim 8 wherein said non-transitory computer-readable medium is a CD-ROM.

16. A method of enabling a user to update one or more low-level resources of a computer system in a user-friendly manner, said method comprising:

generating a bootable image file of a plurality of computer files that are utilized in a pre-boot environment;

creating a menu-driven update guide by using at least one extensible firmware interface (EFI) file and at least one initialization (INI) file, wherein said menu driven update guide requests one or more responses from said user and to initiate updating of said one or more low-level resources based on said one or more responses;

downloading said bootable image file from a web site where new bootable image files are periodically posted;

providing said user access to said bootable image file such that said user boots said computer system from said bootable image file;

in response to booting said computer system from said bootable image file, providing said menu-driven update guide in said pre-boot environment;

receiving said one or more responses from said user in response to said menu-driven update guide; and updating said one or more low-level resources based on said one or more responses.

17. The method as recited in claim 16 wherein said one or more low-level resources comprise a firmware image.

18. The method as recited in claim 16 wherein said one or more low-level resources comprise a driver.

19. The method as recited in claim 16 wherein said one or more low-level resources comprise an EFI (Extensible Firmware Interface) application.

20. The method as recited in claim 16 wherein said pre-boot environment is an EFI (Extensible Firmware Interface) environment.

21. The method as recited in claim 16 wherein said bootable image file is formatted according to an ISO 9660 image file format.

22. The method as recited in claim 16 wherein said plurality of computer files includes one or more software tools and one or more updated versions of said one or more low-level resources such that in a single procedure said user can perform a system-wide update of said one or more low-level resources of said computer system.

23. The method as recited in claim 16 wherein said user boots said computer system from a computer-readable medium having said bootable image file.

24. The method as recited in claim 23 wherein said computer-readable medium is a CD-ROM.

25. The method as recited in claim 16 wherein said user boots said computer system using a remote-boot process and said bootable image file stored in a second computer system.

* * * * *